July 22, 1924.

1,501,909

F. A. LUNDQUIST

AUTOMATIC TELEPHONE EXCHANGE

Original Filed Jan. 22, 1920   3 Sheets-Sheet 1

July 22, 1924.

F. A. LUNDQUIST 1,501,909

AUTOMATIC TELEPHONE EXCHANGE

Original Filed Jan. 22, 1920  3 Sheets-Sheet 3

Witness:
R Burkhardt

Inventor:
Frank A Lundquist
By Casper L. Redfield
atty

Patented July 22, 1924.

1,501,909

UNITED STATES PATENT OFFICE.

FRANK A. LUNDQUIST, OF CHICAGO, ILLINOIS, ASSIGNOR, BY MESNE ASSIGNMENTS, TO HENRY S. CONRAD, TRUSTEE.

AUTOMATIC TELEPHONE EXCHANGE.

Application filed January 22, 1920, Serial No. 353,235. Renewed April 11, 1924.

*To all whom it may concern:*

Be it known that I, FRANK A. LUNDQUIST, a citizen of the United States of America, and a resident of Chicago, county of Cook, and State of Illinois, have invented certain new and useful Improvements in Automatic Telephone Exchanges, of which the following is a specification.

My invention relates to automatic telephone exchanges, and has for its object, improvements in such organizations.

In the present application I have illustrated a line switch which makes connection to a selector, a selector which makes connection to a connector, and a connector which makes connection to the line switch of a called subscriber. Such devices represent the elements of an exchange of one thousand capacity. For exchanges of larger capacities, additional selectors would be inserted between the line switches and the connectors in the well known manner.

In exchanges as at present constructed, each switch used in making a call has one or more magnets thereon kept continually energized during conversation. The main object of the present improvements is the reorganization of the devices so that all magnets on calling line switches and on selectors will be de-energized during conversation.

Figure 1:
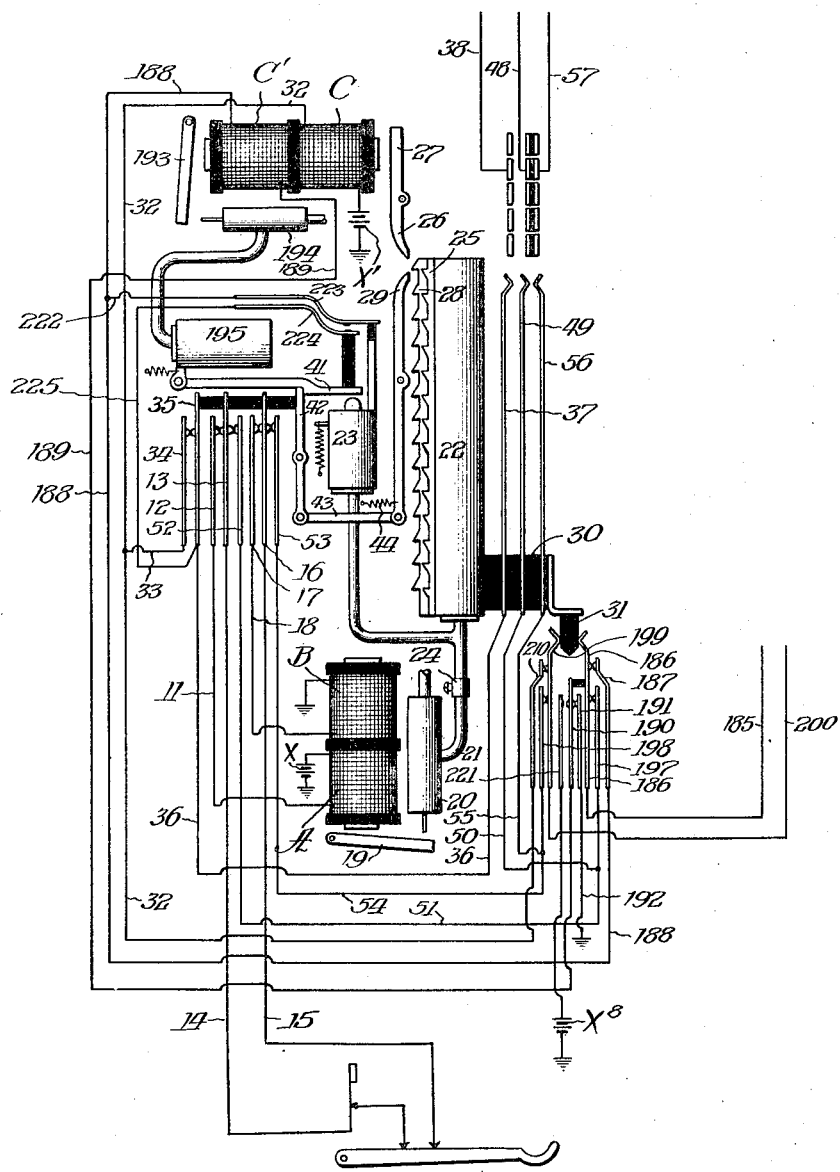
Figure 2:
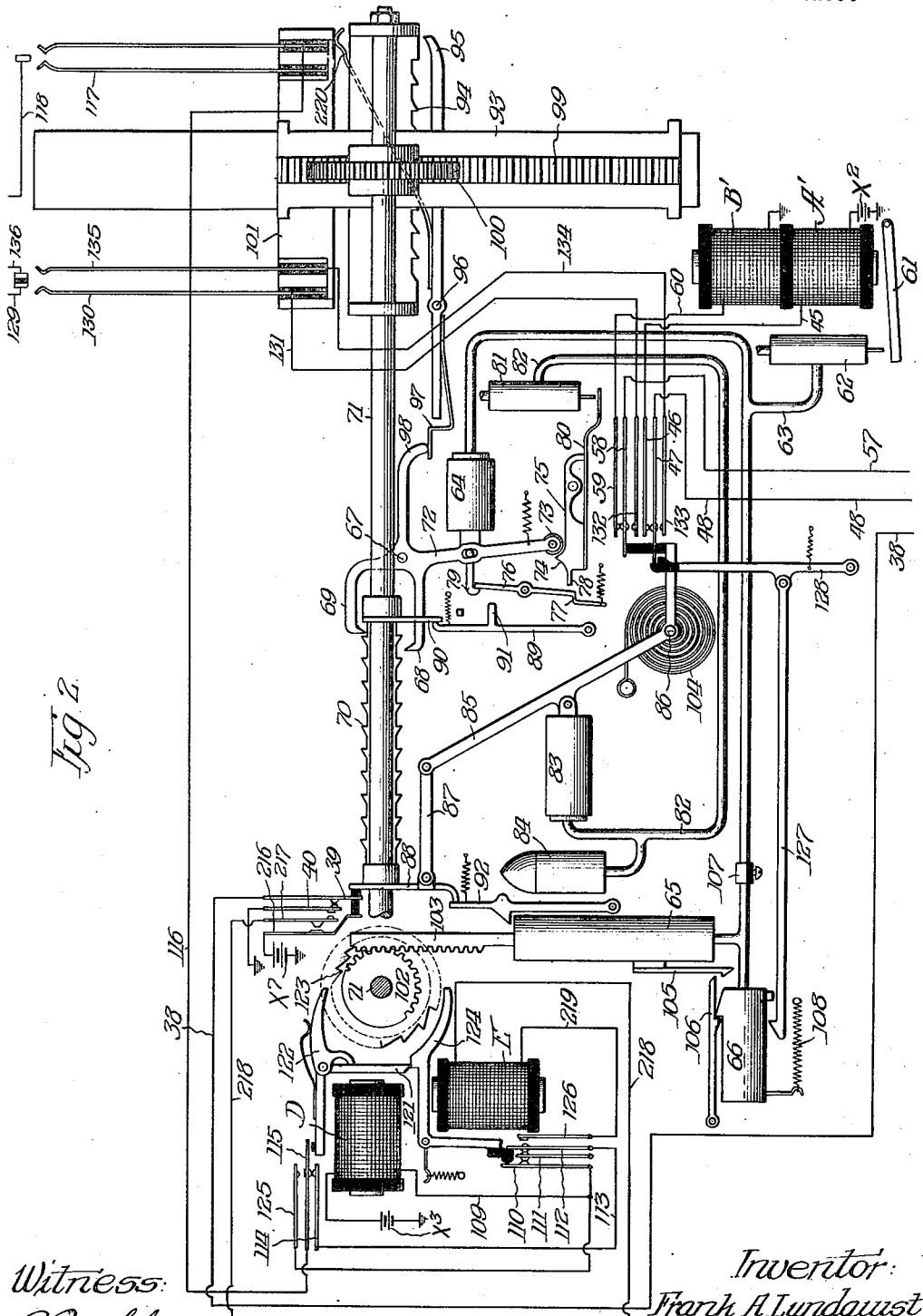
Figure 3:
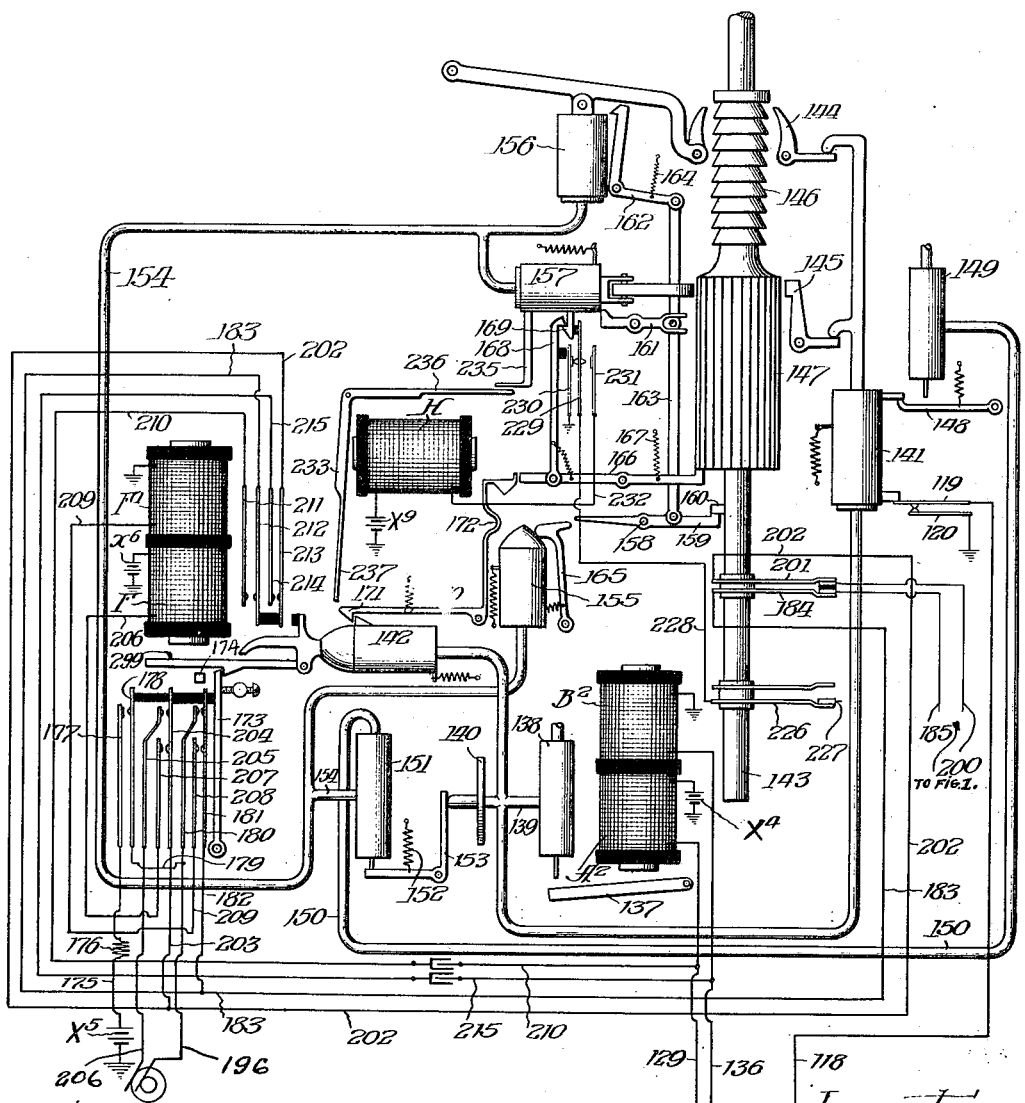

In the accompanying drawings, which are diagrammatic,

Fig. 1 represents the line switch;
Fig. 2 represents the selector; and
Fig. 3 represents the connector.

In the present exchange, the parts are moved by pneumatic motors which are controlled by suitable air valves, and these in turn are controlled by magnets. The motors consist of caps placed on stationary parts. When a valve admits compressed air to the interior of a stationary part, the cap moves longitudinally thereon. When air is exhausted from the stationary part, the cap is retracted by gravity or by a spring.

The valves are in the nature of check valves which receive air at the end and discharge it at the side to a motor or to some other valve. At the end of a valve opposite that to which is connected the general air supply, is a projecting pin. When this pin is pushed inward by an arm or lever, compressed air flows from the source to a motor. When the arm or lever is withdrawn from the pin, air is exhausted from the motor.

A valve of this kind is illustrated in detail in my pending application No. 244,731, filed July 13, 1918. A motor of the kind here used is illustrated in my pending application No. 248,104, filed August 3, 1918.

In Fig. 1, the lines 14 and 15 extend to a subscriber's local station at which there is assumed to be the ordinary apparatus including a telephone set and a calling device. When the subscriber at the local station lifts his receiver from its hook he closes connection between lines 14 and 15 whereupon a circuit is completed as follows: ground at center of Fig. 1—battery X—coil A—11—12—13—14—local station—15—16—17—18—coil B—ground.

This causes the attraction of the armature 19 which opens valve 20 and permits compressed air to flow from the general supply pipe thru pipe 21 to the motors 22 and 23. The pipe 21 has therein a regulating valve 24 by which the quantity of air flowing to motor 22 will not cause that motor to move faster than a predetermined speed. The motor 23 is loaded by a retractile spring or by weight so that it will not move so easily or readily as will motor 22. Under these conditions, motor 22, when moving, will absorb the air flowing past valve 24 to such an extent that motor 23 will not move until motor 22 has stopped.

The motor 22 has thereon a rack 25 arranged to be engaged by a pawl 26 on armature 27 to stop the upward movement of said motor, and another rack 28 arranged to be engaged by a pawl 29 to hold the motor against downward movement. Normally both pawls are out of engagement with their respective racks.

Also on motor 22 is a piece of insulation 30 which carries insulated wipers 49, 56 and 37 arranged to engage contact pieces shown directly above them. From one horizontal row of these contact pieces, wires are shown extending to the selector shown in Fig. 2. Other horizontal rows represent terminals from which extend similar wires (not shown) to other similar selectors.

Carried on the block 30 is a piece of insulation 31 which, when the motor 22 is in its lowest or normal position, holds the adjacent contact springs in the position shown. When, however, the motor 22 moves upward, the piece 31 is carried clear of these springs and they then move by their own resiliency to their alternative position.

When the motor 22 moves upward as the result of admitting compressed air thereto, it carries its wipers over the terminals of successive selectors until it finds an idle one which is assumed to be the one having wires shown connected thereto. When this occurs a circuit is completed as follows: ground in upper part of Fig. 1—battery X'—coil C—32—33—34—35—36—37—38— to Fig. 2—39—40—ground.

This causes magnet C to attract its armature 27 and throw pawl 26 into rack 25 to stop motor 22 with its wipers on the terminals of the trunk leading to the idle selector. The stopping of motor 22 permits the air flowing thru pipe 21 to then move motor 23 and cause it to lift catch 41 from the centrally pivoted lever 42. The lever 42 is connected by link 43 with the lower end of pawl 29. When the catch 41 is thus released, the spring 44 throws pawl 29 into rack 28 so as to prevent motor 22 falling to its lower position when the air therein is exhausted.

The release of the lever 42 from the catch 41 permits the adjacent contact springs to shift to their alternative position. One of the effects of this shift is to disconnect the station wires from coils A and B and connect them to the wipers 49 and 56 carried by the motor 22. When this occurs a circuit is completed as follows: ground at the lower part of Fig. 2—battery X² coil A'—45—46—47—48— to Fig. 1—49—50—51—52—13—14— local station —15—16—53—54—55—56—57— to Fig. 2—58—59—60—coil B'—ground.

The effect of a current flowing over the circuit just given is to attract the armature 61 which opens the valve 62 and permits compressed air to flow thru pipe 63 to three of the motors shown in Fig. 2. But before we follow out the results of this we will return to the effects produced at the line switch by breaking the circuit for the magnet A—B. The first effect is to permit the armature 19 to fall back and let the valve 20 close. This exhausts air from motors 22 and 23. Motor 22 is held in its advanced position by pawl 29, but motor 23 falls back. When motor 23 advanced as previously described, it raised the free ends of springs 223 and 224, but in such a way as to keep them separated. But when motor 23 falls back, spring 223 falls also, but spring 224 is supported in an elevated position by reason of catch 41 being released from and supported upon the end of lever 42. This makes a connection which will be found in a release circuit to be described later.

The shift of the springs which broke the circuit for the magnet A—B also broke the circuit for the coil C at the springs 34—35. While this occurs simultaneously with the breaking of the circuit for magnet A—B, it is before air has time to become exhausted from motor 22. The pawl 26 does not, however, release the motor 22 and permit it to advance under expansion of the contained air because the pivot of pawl 26 is offset from the side of the motor so that upward pressure only acts to hold the pawl tightly in the rack 25. It is only after the motor 22 has fallen slightly as a result of air being exhausted that pawl 26 becomes released from the rack.

From the foregoing description it will be seen that at the time an idle selector is seized, all magnets on the line switch are cut out of the battery circuit. Also, that air is exhausted from all motors, and the wipers are maintained on the terminals of the found trunk simply by the fact that the pawl 29 is in engagement with the rack 28.

Returning now to Fig. 2, it will be seen that the pipe 63 conveys compressed air to motors 64, 65 and 66. Of these, motors 65 and 66 are restrained at this time from movement by adjacent catches, with the result that the admission of compressed air to pipe 63 at first causes only a movement of motor 64. This motor is connected to a multiple armed lever pivoted at 67. The arms 68 and 69 are parts of an escapement operating upon the teeth 70 mounted upon the longitudinally movable shaft 71. When this shaft is under tension to move to the right, and motor 64 connected to the arm 72 vibrates the lever on its pivot 67, the arms 68 and 69 permit the shaft to move step by step. But the first action of seizing an idle trunk results only in putting a continuous current thru magnet A'—B', and this puts continuous air pressure on the motor 64.

The first outward movement of the motor 64 causes the roller 73 on arm 72 to pass over the hump 74 on lever 75 to move said lever on its pivot. Adjacent to these parts is a lever 76 having a catch 77 arranged to engage a projection 78 on the lever 75 and hold it in a tilted position. On the motor 64 is a hook 79 which normally holds the lever 76 with its catch 77 clear of projection 78, but when the motor 64 first moves as a result of air being admitted thereto the catch is permitted to engage the projection and hold the lever 75 in tilted position.

On the lever 75 is a spring 80 which serves to open the valve 81, when the lever is tilted as described, and permit compressed air to flow thru pipe 82 to motors 83 and 84. The motor 83 is connected to a lever 85 which is pivoted at 86 and is connected thru link 87 to an arm 88 on the shaft 71. The admission of air to motor 83 puts a longitudinal strain on shaft 71, and this occurs immediately following a partial movement of the escapement 68—69 due to the first movement of motor 64. By the operations just described the shaft 71 is moved half a step to the right, and this results in opening the spring contacts 39—40 in the previously described circuit for the magnet C of the line switch. It also permits springs 216 and 217 to close.

Supported near the lever 76 is a lever 89, the upper end of which is engaged by an arm 90 on the shaft 71. When the shaft 71 moves a half step as described, the lever 89 follows it under the action of the adjacent spring, but not far enough to permit the projection 91 on lever 89 to engage lever 76 and push catch 77 from projection 78. However, the next step of shaft 71 will permit such engagement and cause the release of catch 77. The half step of shaft 71 moves arm 88 away from the lever 92, but not far enough to release the catch which holds motor 65 from rising. But further movement of the shaft will permit such release. In the meantime, however, the motor 84, which received air at the same time that motor 83 received it, rises and prevents such release of motor 65 until motor 84 falls back. The motor 84 is a slow or sluggish motor, the slowness of which is accomplished by the simple expedient of restricting the size of the passageway thru which air flows to and from it.

On the right hand end of the shaft 71 is a carriage 93, and on this carriage is a ratchet 94 arranged to be engaged by a pawl 95 pivoted at 96. On the tail of this pawl is a spring 97 which is engaged by the arm 98 of the multiple armed lever pivoted at 67. When the motor 64 is first advanced, the arm 98 acting on spring 97 throws pawl 95 to a position to engage the ratchet 94 and hold the shaft 71 against return movement.

On the carriage 93 is a sliding rack 99 engaged by a gear 100 fast upon the shaft 71. On the upper end of the rack 99 is a cross head 101 which carries wipers designed to establish circuits to be described hereinafter.

On the left end of the shaft 71 is a gear 102 which engages a rack 103 moved by motor 65. When the motor 65 operates it rotates shaft 71, and that, operating thru gear 100 and rack 99, elevates the wipers on cross head 101, as will be described later. For the purpose of showing the gear 102 and the rack 103 in the diagram, the left end of the shaft 71 is shown broken off, and the gear and adjacent parts shown in different elevation.

When the subscriber lifts his receiver from its hook, his line switch goes thru the operations of finding an idle trunk and cutting all of its power devices from their sources of power as was described. This connects the magnet A'—B' in the local station circuit, and puts air pressure on the motors 64, 65, 66, 83 and 84. The motor 64 moves the multiple armed lever to the left to partially operate the escapement, the motor 83 applies pressure to the shaft 71 which moves far enough to open springs 39 and 40, and motor 84 rises to hold the catch lever 92 from movement. The motors 65 and 66 are locked against movement.

When the subscriber operates his calling device he first breaks and then remakes the circuit thru the magnet A'—B' one or more times, leaving the circuit made when he finishes the preliminary operation which usually consists in the stoppage of a dial movement. This break and remake of the circuit causes the armature 61 to fall back and then be attracted again, one or more times, and this causes air pulsations in pipe 63. The motor 64 is constructed to respond to these pulsations, with the result that the multiple armed lever is vibrated on its pivot 67. This lets the shaft 71 and carriage thereon move to the right under the pressure applied by motor 83 a number of steps which correspond to the number of electrical pulsations sent to the magnet A'—B' as a result of moving the dial of the calling device. The movement of the shaft permits projection 91 on lever 89 to strike lever 76 and release catch 77 from projection 78 on lever 75. But during these pulsations the roller 73 is moving back and forth rapidly over the hump 74, and lever 75 is a heavy or weighted one and consequently sluggish. As a consequence the valve 81 is held open during the reciprocations of the motor 64.

But when the pulses cease, the roller 73 comes to rest at the left of hump 74, and catch 77 is released from projection 78. Under these conditions the valve 81 closes and shuts air from motors 83 and 84. With the motor 64 at the left, arm 98 presses hard enough upon spring 97 to keep pawl 95 in engagement with ratchet 94, and prevent the return of shaft 71 under the action of spring 104 on lever 85. As a consequence motor 83 is held stationary, but motor 84 falls back and releases the catch on lever 92 so that motor 65 may rise under the action of air pressure maintained in pipe 63 by the open condition of valve 62. As motor 65 rises, hook 105 on the motor releases catch 106 from motor 66 so that it also may move. But in the pipe leading to motors 65 and 66 is a regulating valve 107, and motor 66 is loaded by spring 108 more than motor 65 is loaded by the parts it moves. As a result, motor 65 absorbs the air passing valve 107 so that motor 66 does not start until motor 65 stops.

The motor 65 rises, rotating the shaft 71, and carries the wipers on cross head 101 over the contact terminals of trunks leading to connector switches, one set of which terminals is shown over the wipers in Fig. 2. When the wipers reach the terminals of an idle trunk a circuit is completed as follows: ground at the left in Fig. 2—battery X³—coil D—109—110—111—112—113—114—115—116—117—118 to Fig. 3—119—120—ground.

This attracts armature 121 to permit pawl 122 to fall into ratchet wheel 123 on shaft 71 and stop the wipers on the terminals of the found trunk. The attraction of armature 121 also breaks the circuit for magnet D at springs 114 and 115 but remakes it at 125, and releases armature 124 so that the pawl on the end thereof may engage other teeth on the ratchet 123 and prevent the return of the wipers when air is exhausted from motor 65. The release of armature 124 by armature 121 shifts spring 112 from 111 to 126 so as to prepare a circuit for magnet E to be used later in release. The pawl 122 is pivoted upon the armature 121, and said pawl engages the ratchet wheel at the instant the armature slips from the shoulder on armature 124. Between this shoulder and the core of magnet D is a free space in which the armature 121 may vibrate without affecting the pawl 122. In such vibration the spring 115 will have its electrical connection shifted back and forth between springs 114 and 125.

When motor 65 is stopped by pawl 122 falling into ratchet wheel 123, motor 66 then receives air enough to move it, and in moving it operates thru rod 127 to withdraw the supporting lever 128 from the adjacent contact springs. These springs then shift to their alternative position which results in shifting the connections of the extended station wires 48 and 57 from the magnet A'—B' to wires leading to wipers on the cross head 101. When this occurs a circuit is completed as follows: ground in the lower part of Fig. 3—battery X⁴—coil A²—129 to Fig. 2—130—131—132—58—57 to Fig. 1—56—55—54—53—16—15—local station—14—13—52—51—50—49—48 to Fig. 2—47—133—134—135—136 to Fig. 3—coil B²—ground.

This attracts armature 137 to open valve 138 and permit compressed air to flow from the general source or supply thru pipe 139 to sylphon 140 and motors 141 and 142. The sylphon 140 is a quick short stroke motor in the form of a diaphragm which responds to pulsations in the pipe 139. The motors 141 and 142 are slow or sluggish motors which respond to continuous air pressure but not to the rapid pulsations used for operating some of the other motors. The motor 141 is free to move, but the motor 142 is at first held in its normal position by an adjacent catch 171. The first movement of the motor 141 opens the springs 119 and 120 and thereby breaks the circuit for the magnet D of the selector. This permits spring 115 to engage 114, but produces no other result. When the operation of motor 66 cuts the magnet A'—B' from the local station, the armature 61 falls back and the valve 62 cuts the air supply from motors 64, 65 and 66. The motors 64 and 66 fall back, and the selector is held in its advanced position solely by pawls 95 and 124. It is to be observed that by this operation all power, both electrical and pneumatic, is cut from the selector, and that the selector remains in this condition during conversation and until release. The drawings represent the selector as making connections to a connector. It will be obvious, however, that the effect upon the selector of Fig. 2 would be no different if the device of Fig. 3 were a second selector instead of a connector. Also, that the effect produced upon the selector in seizing a connector would be no different whether such selector was a first, second or third selector.

The connector here shown is of the well known type in which a shaft 143 is moved first longitudinally and is then rotated to bring wipers thereon into engagement with terminals of wires leading to some called subscriber. As the motor 141 rises, it permits holding pawls 144 and 145 to fall into their respective ratchets 146 and 147 on said shaft. The movement of the motor 141 also permits lever 148 to open valve 149 and permit compressed air to flow thru pipe 150 to valve 151. By this means the pipe 150 becomes an extension of the general air supply pipe. The valve 151 is normally held open by a spring 152 acting on lever 153, but the admission of air to sylphon 140, as before described, moves this lever so that the valve 151 is closed at the time when air reaches it by reason of the opening of valve 149.

The valve 151 controls the supply of air to pipe 154 which leads to a slow motor 155 and to two quick motors 156 and 157. These motors are quick in the sense that they are constructed to respond by reciprocations to the pulsations used in pipe 154, while the slow motor responds by advancing but not by falling back. Motors 141 and 155 are "slow" in this sense.

Pivoted at 158 on the switch frame is a lever 159, one end of which is engaged by a projection 160 on the shaft 143 when said shaft is in its lowest position. Pivoted at convenient places are a catch lever 161' which normally holds motor 157 from operating, and another catch lever 162 which is adapted to restrain motor 156 but is normally free therefrom. A rod 163 connects levers 159, 161 and 162. A spring 164 connected to lever 162 acts to move all three levers on their pivots when the upward movement of shaft 143 removes projection 160 from lever 159. Another lever 165 operated by rise of motor 155 is designed to pass under the tail of lever 159 to prevent a shift of the catch levers prematurely.

The seizing of the connector puts current on the magnet $A^2$—$B^2$, and this in turn causes an operation of motor 141 to release the holding pawls and extend the air supply to valve 151 which is closed when current is on the magnet. When the subscriber next operates the dial of his calling device to send electrical impulses thru the magnet $A^2$—$B^2$, these impulses are reproduced as air pulsations in the pipe 154 leading to the motors 155, 156 and 157. At this time the motor 157 is locked by lever 161, but the first admission of air to pipe 154 causes motor 156 to lift the shaft 143, and motor 155 to push lever 165 under lever 159 so that spring 164 will not release lever 161 from motor 157. The motor 156 makes one complete reciprocation and raises the shaft 143 one step for each pulsation in pipe 154, but motor 155 remains advanced during pulsations because it is slow to return. When the pulsations cease, motors 155 and 156 fall back. The retraction of motor 155 frees lever 165 from lever 159 and permits spring 164 to shift the catches so as to release motor 157 and lock motor 156.

Pivoted at a convenient point is a lever 166 which has one end engaged by the lower end of the ratchet 147, or some other body on shaft 143, to hold said lever against movement by spring 167 when the shaft is in its lowest position. Connected to the other end of the lever 166 is a hook 168 which normally engages another hook 169 on the motor 157. Adjacent to the motor 155 is a bell crank lever 170, the vertical arm of which normally rests against the left hand end of lever 166, and the horizontal arm of which has a hook 171 which normally engages motor 142 to hold it from advancing. On the vertical arm of lever 170 is a hump 172 which is engaged by motor 155 when it rises.

When the subscriber next operates the dial of his calling device, the consequent pulsations in the pipe 154 cause operations of the motors 155 and 157, but not 156. The operations of motor 157 rotate the shaft 143 to carry its wipers over bank contacts to a desired point, and release hooks 168—169 so that lever 166 moves away from lever 170. But the rise of the motor 155 causes it to engage the hump 172 and retain the catch 171 in holding position on motor 142. But when the series of impulses thru magnet $A^2$—$B^2$ cease, the motor 155 falls back, and motor 142 advances until arrested by the lever 173 striking stop 174. This shifts the adjacent contact springs so that spring 181 connects to spring 180 and 208, and spring 204 connects to springs 205 and 207. The springs 180 and 205 are terminals of a ringing circuit. Also 177 and 178 connect battery to a circuit to be described.

When the shaft 143 is rotated as described, the wipers 184 and 201 stop on contacts which are terminals of wires 185 and 200 leading to the line switch of the called subscriber. As the line switch of the called subscriber is exactly like that shown in Fig. 1, that drawing may serve the double purpose of representing both the calling and called switch in the following description. Consequently, when the motor 142 is arrested as described, a circuit is completed as follows:

Ground at lower left hand part of Fig. 3—battery $X^5$—175—176—177—178—179—180—181—182—183—184—185 to the line switch as shown in Fig. 1—186—187—188—coil C'—189—190—191—192—ground.

This attracts armature 193 to open valve 194 and permit compressed air to flow from the general supply pipe to the motor 195, which motor moves to the right to permit the adjacent contact springs to move to their alternative position. When this occurs a ringing circuit is completed as follows:

Ringing generator—wire 196 at lower left hand part of Fig. 3—180—181—182—183—184—185 to Fig. 1—186—197—51—52—13—14—local station—15—16—53—54—198—199—200 to Fig. 3—201—202—203—204—205—206—generator.

This calls the subscriber who removes his receiver, whereupon a circuit is completed as follows:

Ground at the left central part of Fig. 3—battery $X^6$—coil F—206—207—204—203—202—201—200 to Fig. 1—199—198—54—53—16—15—local station—14—13—52—51—197—186—185 to Fig. 3—184—183—182—181—208—209—F'—ground.

This attracts armature 299 so as to release the catch thereon from lever 173, and permit the springs below the armature to return to their normal position. This breaks the ringing circuit, and the previously described circuit thru the battery $X^5$ and the coil C'. But before this last occurs, the closure of lines 14 and 15 to each other at the called station, as a result of the called subscriber lifting his receiver, completes another circuit as follows:

Ground at upper part of Fig. 1—battery $X^1$—C—32—210—199—198—54—53—16—15—local station—14—13—52—51—197—186—187—188—C'—189—190—191—192—ground. This keeps air on the motor 195 of the called subscriber's line switch, and also attracts the armature 27 so that pawl 26 will prevent the called line switch from advancing from normal position in case air is admitted to motor 22.

When the attraction of armature 299 releases the catch thereon from lever 173, the stop 174 no longer restrains motor 142, and that motor advances to close the springs adjacent to magnet F—F'. Then, when the subscriber at the called station lifts his receiver, a talking circuit is completed as follows:

Calling station—15 of Fig. 1—16—53—54—55—56—57 to Fig. 2—58—132—131—130—129 to Fig. 3—210—211—212—183—184—185 to the called line switch Fig. 1—186—197—51—52—13—14—called station—15—16—53—54—198—199—200 to Fig. 3—201—202—213—214—215—136 to Fig. 2—135—134—133—47—48 to Fig. 1—49—50—51—52—13—14—calling station.

During talking, current is maintained on magnet $A^2$—$B^2$ of the connector thru the calling station over the circuit described for that magnet, and on magnet C—C' of the called line switch thru the called station. All other magnets are cut out. When the subscribers hang up their receivers they break the circuits for these magnets. In the case of the called line switch, armatures 27 and 193 return to normal position, and the latter of these lets motor 195 fall back, which in turn permits the adjacent springs to return to normal position. As nothing else was moved on the called line switch, this switch is normal.

When the calling subscriber hangs up his receiver he breaks the circuit for magnet $A^2$—$B^2$ which was completed thru the calling station. When this occurs, air becomes exhausted from motor 141 at the right in Fig. 3, and this motor falls back to release pawls 144 and 145, and to close contacts 119 and 120. When this last occurs a circuit is completed as follows:

Ground at upper left hand part of Fig. 2—battery $X^7$—216—217—218—E—219—126—112—113—114—115—116—117—118 to Fig. 3—119—120—ground.

Closing this circuit thru magnet E attracts armature 124 to release ratchet wheel 123 so that shaft 71 may rotate back to its normal rotative position. In doing this, cross-head 101, with its wipers 117, 130 and 135, falls to its lowest position, in which position it acts upon spring 220 to overcome spring 97 and release pawl 95 from ratchet 94. When this occurs, spring 104 moves shaft 71 longitudinally to the left to its normal position. In this return, springs 216 and 217 are opened, and springs 39 and 40 are closed, whereupon a circuit is completed as follows:

Ground at lower right hand part of Fig. 1—battery $X^8$—221—190—189—C'—188—222—223—224—225—36—37—38 to Fig. 2—39—40—ground.

This attracts armature 193 to open valve 194 so that motor 195 may move to the right and let catch 41 drop over the end of lever 42. In thus dropping, springs 223 and 224 open to break the circuit for magnet C', whereupon motor 195 falls back to return the adjacent springs to their normal position, and to release pawl 29 from ratchet 28. This permits motor 22 and associated parts to return to normal position.

We will return now to a further consideration of the rotary movement of the connector shaft 143 by which wipers 184 and 201 were brought upon the terminals of the line to be called. On the shaft 143 is a private wiper 226 which moves over the contacts of private banks, one contact of which is shown at 227. When the shaft 143 comes to rest at its advanced position, the wiper 226 puts a ground connection on contact 227 as follows: 226—228—229—230—ground.

If, after this occurs, some other connector should move its private wiper to electric connection with some other contact point connected in multiple with 227, that other connector would find this ground connection to its contact point. Similarly, if some other connector has stopped on a multiple of 227 before this connector had reached that point, then this connector would have found a pre-existing ground connection on 227. This would have occurred as the motor 157 was being advanced to turn ratchet 147 to move the wipers on shaft 143. At such a time the hook 169 on motor 157 is toward the right and pushing spring 229 from engagement with spring 230 to engagement with spring 231. Under these conditions a circuit will be completed as follows:

Ground at central part of Fig. 3—battery $X^9$—magnet H—232—231—229—228—226—227—ground.

This causes the armature 233 to be attracted while the motor 157 is to the right. When the motor 157 falls back, the hook 235 thereon will come under the tail 236 on the armature 233 and hold that armature in its attracted position after the circuit is broken at 229—231. In its attracted position, the end 237 of armature 233 is over the hook 171 which holds motor 142, and this motor can not be released while this armature is in its attracted position. Consequently, if the connector stops on the contacts of a previously called line, the motor 142 cannot advance to complete a ringing circuit as before described. But if the connector first comes upon a previously occupied line and then passes on to another unoccupied one, the hook 235 will first catch and hold the armature 233, and then will release that armature as the motor 157 moves to advance the wipers from the occupied to the unoccupied line.

What I claim is:

1. In a telephone exchange having line switches and selectors, a source of pneumatic power, and wires by which electrical connections are made between line switches and selectors, power devices on the line switches operated by air from said sources to make connections to idle selectors, means for sending impulses of air from said pneumatic sources to operate said selectors to make connections to idle selectors, and means by which upon any such connection being made all power devices on an operated line switch will be disconnected from their sources of power.

2. In an automatic telephone exchange in which electrical connections are extended from one switch to another, air motors at one of the switches one for horizontally moving the switch and another air motor for elevating the switch by the operations of which such extensions are made, and means by which upon the making of such an extension all air motors at the switch involved in such operation will be cut from sources of power.

3. The combination with a switching mechanism, and lines leading thereto, of pneumatic power devices for operating the mechanism to connect said lines to other lines, magnetic devices for transmitting impulses of compressed air for controlling the power devices, and means for disconnecting all such devices at the mechanism when said mechanism completes an operation.

4. The combination with a switching mechanism, and lines leading thereto, of pneumatic devices for operating the mechanism to connect said lines to other lines, magnetic devices for controlling the pneumatic devices by impulses of air, and means for disconnecting the pneumatic and magnetic devices from pneumatic and electrical sources of power when the mechanism completes an operation.

5. In an automatic telephone exchange, a switching mechanism serving to perform some of the intermediate operations in establishing a talking circuit between a calling and a called station, air motors for advancing the mechanism, said motors operated by impulses of air, means for holding it in its advanced position, a magnet for causing the release of the holding means so that the mechanism may return to normal position, a circuit for said magnet held open while the mechanism is standing in its advanced position, means for closing said circuit by a movement of the mechanism which performs the next later operations in establishing the talking circuit, and automatic means for breaking the circuit for said magnet as soon as the mechanism is released.

6. In a telephone exchange having line switches, selectors and connectors, air motors for advancing in succession one switch of each kind to establish a talking circuit between a calling and a called station, the air motors of said selector and connector switches operated by impulses of compressed air, means for holding the switches in advanced position during talking, magnets on the line switches and selectors for causing release of the holding means thereat, circuits for said magnets held open during talking, means for closing the release circuit for the selector by the connector and for the line switch by the selector, and means by which the selector and line switch upon being released break their own release circuits.

7. In an automatic telephone exchange, a selector serving as an intermediate between two other switches in establishing a talking circuit, a pair of pneumatic motors for advancing the selector to select an idle trunk, said motors operated to move the switch in a step by step motion, means for holding the selector in advanced position during talking, a magnet for causing the release of the selector, an open circuit for said magnet, means for closing the release circuit for the selector by a movement of the switch on one side thereof, and means by which the release of the selector breaks its own release circuit and makes the release circuit for the switch on the other side.

8. A line switch, a circuit extending from a local station to said switch, magnetic devices and pneumatic devices on said switch, sources of power for said magnetic and pneumatic devices, means for operating said magnetic devices to cause the operation of said pneumatic devices so as to extend the circuit to some other switch such as a selector, and means by which upon such extension being made all magnetic devices on the line switch will have their electric circuits broken and all pneumatic devices on the line switch will be disconnected from their source of power.

9. A circuit extending from a local station to a line switch, magnetic and pneumatic devices at the line switch, means for operating the devices to extend the circuit from the line switch to a selector, other magnetic and pneumatic devices at the selector, means for operating said devices to extend the circuit to a third switch, sources of power for said magnetic and pneumatic devices, and means by which all magnetic and pneumatic devices at the line switch are cut off from their sources of power when the circuit is extended to the selector and all magnetic and pneumatic devices at the selector are cut off from their sources of power when the circuit is extended to the third switch.

10. The combination with a switching mechanism, and lines leading thereto, of magnetic and pneumatic devices serving to control said switching mechanism to extend a connection, of electric and pneumatic sources of power for operating said devices, and means for disconnecting all devices on said mechanism from their sources of power when the mechanism completes its operation without releasing said connection.

11. In combination, a switching mechanism, a group of lines divided into sub-groups, wipers on said mechanism for connecting said lines, a pneumatic motor for moving said wipers step by step in a vertical direction to select a sub-group, another pneumatic motor for rotating said wipers step by step to select a line in the selected sub-group.

FRANK A. LUNDQUIST.